United States Patent Office 3,117,875
Patented Jan. 14, 1964

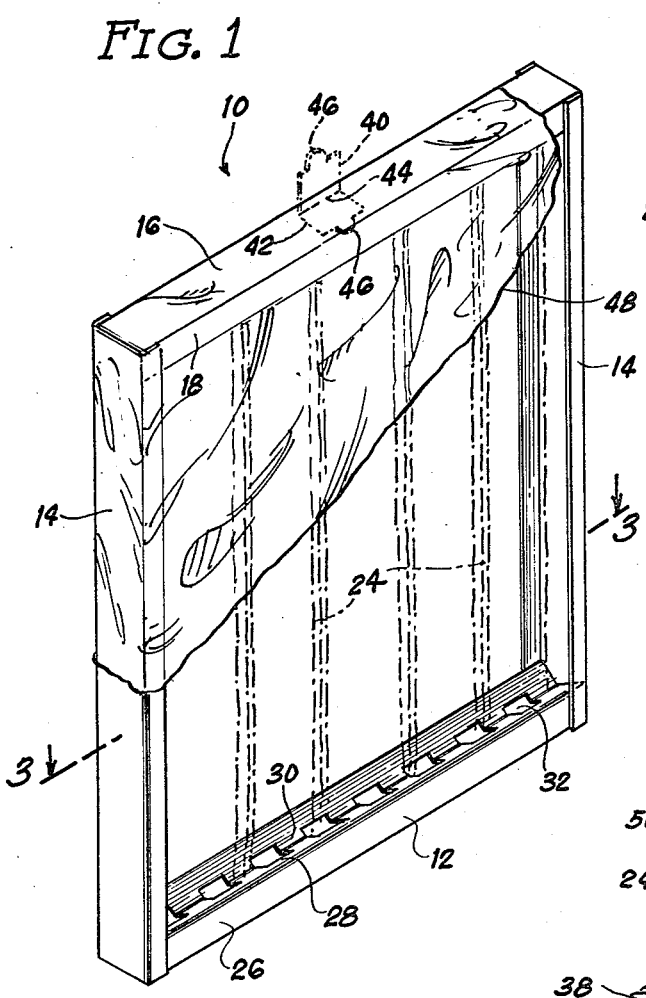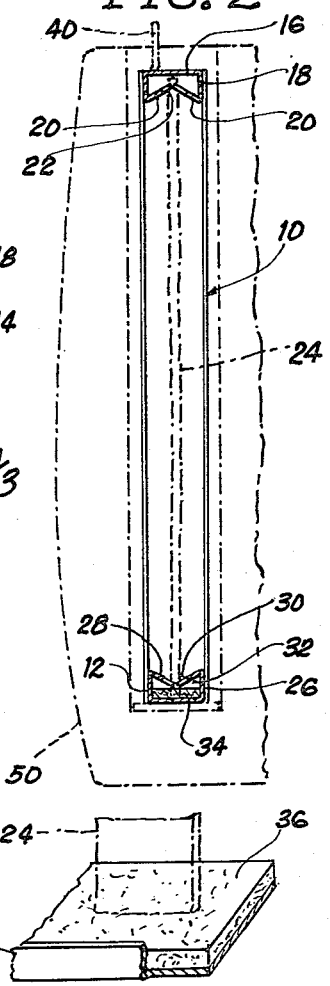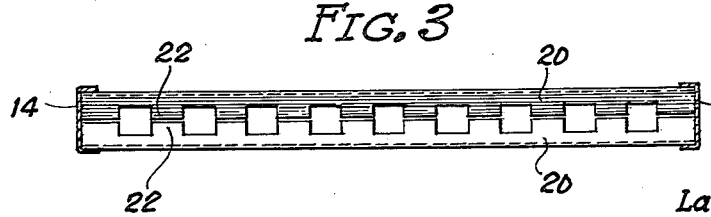

3,117,875
MEAT PACKAGE
Lawrence C. Burns, 2341 N. Commonwealth, Chicago, Ill., and Edward M. Krakauer, 1456 Covell Ave., Highland Park, Ill.; said Burns assignor to said Krakauer
Filed Sept. 18, 1961, Ser. No. 138,637
5 Claims. (Cl. 99—174)

This invention relates to a meat package, and it relates more particularly to a meat package of unique design which is suitable for the packaging of meat products and for the cooking and heating of the meat without removal of the meat from the package.

Prior attempts have been made to provide packages for meat which can be cooked within the package or, if already cooked or partially cooked, then heated to a desired state. The prior art has made efforts in this direction, since a great deal of convenience would be available if the steps of unwrapping the meat and cooking the meat in a separate utensil could be avoided. With such an arrangement the utensil cleaning can be eliminated and obvious sanitary advantages would arise, since handling of the meat would be greatly reduced.

Attempts have also been made to design a package which would be capable of use in conjunction with standard household toasters. Obviously, such a compartmented heating means with a standard timing device offers great convenience for heating and cooking if suitable packages could be devised.

The specific package structures designed by the prior art are considered to be lacking in many respects. Existing designs in many cases do not provide a transparent cover whereby the meat therein can be inspected. Similarly, prior packages have lacked sufficient rigidity whereby they could not be readily employed in a standard toaster or other conventional heating unit without damage to the contents or damage to the heating coils.

A further general drawback of prior designs relates to the lack of adequate means for collecting drippings during the heating and cooking. It will be appreciated that the presence of fat, grease, meat juices and other drippings in a toaster or in any other cooking utensil is highly undesirable. Prior art packages of the type described have either failed to prevent dripping of these substances out of the packages or are designed whereby the drippings will collect within the package around the meat thus detracting from the taste thereof.

It is an object of this invention to provide a meat package of an improved design which is suitable for the heating and cooking of meat products without removal of the meat from the package.

It is an additional object of this invention to provide a meat package which eliminates the steps of removing the contents from the package and cooking in a separate utensil and which, therefore, avoids the necessity of cleaning the utensils while providing improved sanitary conditions.

It is a further object of this invention to provide a meat package which permits inspection by potential purchasers, which is designed whereby it can be safely employed in an electric toaster or similar device and which is adapted to recover drippings from the meat without passing of the drippings out of the package and without contamination of the meat products.

These and other objects of this invention will appear hereinafter and for purposes of illustration, but not of limitation, specific embodiments of this invention are shown in the accompanying drawings in which—

FIGURE 1 is a perspective view of the meat package of this invention;

FIGURE 2 is a side elevation, partly in section, illustrating the package as it appears when used in conjunction with a toaster or similar heating unit;

FIGURE 3 is a sectional view taken about the line 3—3 of FIGURE 1; and

FIGURE 4 is a perspective view of an alternative arrangement for collecting drippings from the meat in the packages.

The present invention generally relates to a meat package which is designed for the cooking and heating of meat contained therein. The package of this invention comprises a rigid, rectangular frame and includes means for suspending the meat within the frame and means at the bottom of the frame for collecting drippings from the meat during the cooking and heating operation.

The package of this invention is particularly designed for the packaging of meat in the form of strips such as bacon. The following specific description will be generally confined to the packing of bacon. However, it will be apparent that the package of this invention is suitable for other meats, particularly meat products in strip form. It will also be apaprent that the package of this invention is particularly adaptable for use in connection with meats which produce significant amounts of grease, fats, juices and other drippings during heating and cooking.

Referring to the drawings, FIGURE 1 illustrates a package 10 which is comprised of a bottom portion 12, upstanidng, relatively rigid side arms 14 and a top portion 16. In the embodiment shown, the top portion 16 is provided with side walls 18 terminating in flaps 20. The flaps 20 are provided with opposed extensions 22 which serve to secure the bacon strips 24 within the package. The bacon strips are adapted to be positioned between the flaps 20 when they extend downwardly. After positioning of the strips, the flaps will be bent upwardly into the position shown to clamp the bacon strips therebetween. Since the extensions 22 extend a distance greater than half the distance between the side walls 18, there will be a secure suspension of the strips.

It will be understood that the particular suspending means illustrated is provided only as an example of one suitable means for holding the bacon strips within the packages. It will be apparent that the suspending means shown represents a simple, and inexpensive manner for securing the bacon. However, various suspending means which also provide an inexpensive manner of suspending the strips are contemplated. Thus, the frame could be hinged at its base and slit along the sides and top whereby the strips could be clamped between the close top pieces. Furthermore, various independent clamp mechanisms could be directly integrated with the top portion 16 for suspending the bacon strips.

The bottom portion 12, shown in FIGURES 1 and 2, comprises walls 26 which terminate in flaps 28. The flaps are provided with opposed extensions 30 and the bottom portion shown thus provides for clamping of the bacon in a manner similar to that of the top portion 16.

The bottom portion design provides a trough for collecting drippings from the bacon strips. The bottom design also provides a chamber 32 which opens into the package for collecting the drippings. It will be apparent that any drippings which occur will be directed through the openings between the extensions 30 into the chamber 32, and none of the drippings will pass into the heating unit employed. Furthermore, it is obvious that this chamber is essentially out of contact with the bacon strips.

In a special embodiment of this invention, there is provided an absorbent pad at the bottom of the package which is particularly effective as a means for preventing dippings from passing out of the package or building up around the bacon strips. An absorbent pad 34 can be placed within the chamber 32 whereby it will soak up the meat drippings. With this arrangement there is provided a structure which eliminates any danger of drippings passing out of the chamber as a result of holes which could accidentally be formed therein.

FIGURE 4 illustrates a particularly effective and economical design wherein an absorbent pad 36 is provided to extend completely over the bottom 38 of a package. The bacon strip 24 will be suspended from above and all drippings will be readily accommodated and absorbed by the pad. Various fabrics, sponge materials and paper materials can be employed as the absorbent pads, and felt pads are cited as a nonlimiting example.

Various materials are suggested for use in the construction of the rigid framework of the package. Stiff cardboard with a thin foil coating or heat resistant fiber sheets have been found to have the necessary stiffness to lend rigidity to the frame. It is also desired that the package body have low electrical conductivity in order to avoid interference with the heating coils in a toaster or the like.

The packages may be provided with a holding tab whereby they can be grasped when being lifted from a toaster. The tab 40 illustrated can be provided by forming perforations 42 and score marks 44 in the top of the package. A tear extension 46 can be provided for lifting the tab 40 to the dotted line position shown.

As noted, the packages of this invention permit observation of the contents by a prospective buyer. At the same time, it is essential that the packages be closed prior to use in order to prevent spoilage and for sanitary purposes. For this reason, a transparent sheet 48, such as cellophane, is provided for the package of this invention. In the use of the package the cover 48 will be removed prior to insertion of the package into a toaster such as shown at 50 in FIGURE 2. The contents can then be heated or cooked to any desired condition.

The provision for removal of the cover 48 from the package is an extremely desirable improvement over prior packages. Thus with the instant invention, the bacon strips are directly exposed to the heating coils of the toaster without an intermediate barrier. In prior devices it has been necessary to provide a foil or other barrier through which the heat was conducted to the meat. The structure of this invention provides for direct and more efficient heat application and in addition provides a product that is more satisfying to the taste. That is, in the arrangement of this invention, the meat is toasted or broiled since the meat is directly presented to the heating coils. Accordingly, a crisper, more desirable cooked product results.

It is contemplated that the meat strips can be all or partially pre-cooked, and instructions can be printed on the package for indicating the heating time and temperature which will result in specified degrees of cooking. It has been found, for example, that bacon strips, which have been pre-cooked to approximately 75 percent of completeness, can be placed in a conventional toaster and fully cooked in a normal "pop up" interval.

The number of bacon strips in the package will preferably be varied between 4 and 5 in order to accommodate the package to a conventional toaster. It will be apparent, however, that any number of strips are feasible, depending on the particular cooking application contemplated, and, in this connection, more than one row of strips can be employed.

There has been described a meat package which is both inexpensive and highly efficient for the heating and cooking of meat in strip form. The device of this invention is adapted for the holding of strips of bacon or other meat whereby it can be broiled or toasted by exposing both sides of the bacon simultaneously to the coils of a standard electric toaster. The concepts of this invention also provide for the packaging of bacon whereby it can be displayed for viewing by a consumer while being maintained under sanitary conditions. The package is additionally valuable since it is provided with a rigid frame which will prevent collapse during use thus avoiding disruption of the heating function of the toasters and difficulties in removal from the toasters. The package of this invention additionally provides novel and highly effective means for preventing undesirable accumulation of meat drippings during heating and cooking of the meat.

It will be understood that various modifications may be made in the above described meat package which provide the characteristics of this invention without departing from the spirit thereof, particularly as defined in the following claims.

We claim:

1. In a meat package designed for the cooking and heating of partially precooked meat contained therein, the improvement wherein said package comprises a rigid rectangular frame, said frame including means for suspending meat and means at the bottom of the frame for collecting drippings from said meat during the cooking and heating thereof, a transparent removable cover over said frame whereby the meat therein is protected and can be inspected prior to removal of the cover for cooking and heating, and said frame defining open sides whereby the meat within the package will be directly exposed to the heating means during cooking to effect broiling of the meat.

2. A meat package in accordance with claim 1 including means formed on the top of the frame for grasping the package during use.

3. A meat package in accordance with claim 1 wherein the means for collecting said drippings comprises a chamber formed along the bottom of the frame and including means formed in the bottom of the frame for holding the meat therein.

4. A meat package in accordance with claim 3 including an absorbent material disposed within said chamber.

5. In a meat package designed for the cooking and heating of partially precooked meat contained therein, the improvement wherein said package comprises a rectangular frame including rigid top and bottom members and rigid side wall members, means associated with said frame for holding the meat in an upright position within the frame, said frame members being dimensioned whereby the frame can be received in the heating chamber of an electric toaster, and said frame members being spaced apart whereby open sides are defined by the frame members and whereby the meat within the package will be directly exposed to the heating coils during cooking to effect broiling of the meat.

References Cited in the file of this patent

UNITED STATES PATENTS

| | | |
|---|---|---|
| 2,881,078 | Oritt | Apr. 7, 1959 |
| 3,026,209 | Niblack et al. | Mar. 20, 1962 |